United States Patent
Rhee

(10) Patent No.: US 10,283,826 B2
(45) Date of Patent: May 7, 2019

(54) LITHIUM AIR BATTERY CAPABLE OF PREVENTING ELECTROLYTE SHORTAGE

(71) Applicant: Hyundai Motor Company, Seoul (KR)

(72) Inventor: Jun Ki Rhee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 15/270,274

(22) Filed: Sep. 20, 2016

(65) Prior Publication Data

US 2017/0271730 A1 Sep. 21, 2017

(30) Foreign Application Priority Data

Mar. 16, 2016 (KR) .................. 10-2016-0031375

(51) Int. Cl.
*H01M 8/04276* (2016.01)
*H01M 12/08* (2006.01)
*H01M 12/02* (2006.01)

(52) U.S. Cl.
CPC ........... *H01M 12/08* (2013.01); *H01M 12/02* (2013.01)

(58) Field of Classification Search
None
See application file for complete search history.

(56) References Cited

U.S. PATENT DOCUMENTS

| | | | | |
|---|---|---|---|---|
| 2015/0010833 A1* | 1/2015 | Amendola | .......... | H01M 4/8647 |
| | | | | 429/406 |
| 2015/0030940 A1* | 1/2015 | Park | .......... | H01M 12/06 |
| | | | | 429/403 |
| 2015/0295291 A1* | 10/2015 | Sata | .......... | H01M 4/06 |
| | | | | 429/406 |

FOREIGN PATENT DOCUMENTS

| | | |
|---|---|---|
| JP | 2015/153532 A | 8/2015 |
| KR | 10-2012-0115723 A | 10/2012 |
| KR | 10-2012-0126956 | 11/2012 |
| KR | 10-2015-0016730 | 2/2015 |
| KR | 10-2015-0031223 | 3/2015 |
| KR | 10-2015-0079488 A | 7/2015 |
| KR | 10-2016-0013368 A | 2/2016 |
| KR | 10-2016-0015853 A | 2/2016 |

\* cited by examiner

*Primary Examiner* — Tracy M Dove
(74) *Attorney, Agent, or Firm* — Mintz Levin Cohn Ferris Glovsky and Popeo, P.C.; Peter F. Corless

(57) ABSTRACT

A lithium air battery is provided. The lithium air battery prevents the depletion of electrolyte and includes a separation membrane which contacts an electrolyte stored in an electrolyte tank through a gasket which contacts an outer surface of a unit cell. Therefore, when the electrolyte of the lithium air battery is volatilized, the electrolyte is supplied to the inside of the lithium air battery from the electrolyte tank through the separation membrane.

16 Claims, 2 Drawing Sheets

LITHIUM AIR BATTERY CAPABLE OF PREVENTING ELECTROLYTE SHORTAGE

CROSS-REFERENCE TO RELATED APPLICATION

This application claims under 35 U.S.C. § 119(a) the benefit of Korean Patent Application No. 10-2016-0031375 filed on Mar. 16, 2016, the entire contents of which are incorporated herein by reference.

BACKGROUND (a) Technical Field

The present disclosure relates to a lithium air battery, and more particularly, to a lithium air battery that is capable of continuously receiving an electrolyte from the outside.

(b) Background Art

Currently, due to the depletion of fossil fuels, environmental pollution, and global warming, new renewable energy has been developed, but remarkable results have not been achieved. Accordingly, an interest in an energy storage technique, particularly, in a battery field, has increased.

As a result, in lithium ion batteries, recently, metal-air batteries, particularly, lithium air batteries have been actively developed. The lithium air battery is a battery system which uses lithium as a negative electrode and oxygen in air as an active material in a positive electrode (air electrode). In the negative electrode, oxidation and reduction reaction of lithium occurs and in the positive electrode, oxidation and reduction reaction of oxygen flowing from the outside occurs.

Further, the lithium air battery uses oxygen which may be unlimitedly received from the air as the active material. Accordingly, theoretically, the high energy density may be obtained. The theoretical energy density of the lithium air battery is calculated as about 3,200 Wh/kg and about 10 times higher than the lithium ion battery. Further, since the oxygen is used as the active material, there is an advantage in that the lithium air battery is eco-friendly. However, in the lithium air battery, since circulation of the air (oxygen) is a required condition, charge and discharge proceed, and thus, there is a problem in that the liquid electrolyte is volatilized.

As a result, a system of the related art provides a lithium air battery capable of minimizing the depletion of an electrolyte by coating a polyvinylidene fluoride-hexafluoropropylene copolymer on the surface of the separation membrane. However, the lithium air battery is used to improve a soaking property of the electrolyte of the separation membrane, and thus, it is not a fundamental solution.

The above information disclosed in this section is merely for enhancement of understanding of the background of the invention and therefore it may include information that does not form the prior art that is already known in this country to a person of ordinary skill in the art.

SUMMARY

The present invention provides a lithium air battery capable of preventing an electrolyte in the lithium air battery from being exhausted. Additionally, the present invention provides a lithium air battery in which the depletion of electrolyte does not occur and a lifespan is increased. The objects of the present invention are not limited to the objects described above. The objects of the present invention will be more apparent in the description below and implemented by means described in claims and a combination thereof.

The present invention includes the following configuration to achieve the above objects. In an aspect, the present invention provides a lithium air battery capable of preventing the depletion of electrolyte that may include: a cell having a positive electrode that uses oxygen in air as an active material, a negative electrode, a separation membrane interposed between the positive electrode and the negative electrode, and an electrolyte for ionic conductivity and may be interposed between separation plates; a gasket interposed between the adjacent separation plates and may contact the outer surface of the cell; and an electrolyte tank disposed extraneous to the gasket and used to store the electrolyte, in which the separation membrane may contact the electrolyte stored in the electrolyte tank through the gasket.

In an exemplary embodiment, the separation plates may include a positive electrode separation plate positioned at the positive electrode side and a negative electrode separation plate positioned at the negative electrode side. In another exemplary embodiment, the positive electrode separation plate may include an air flow path formed in intaglio on the inner surface. In still another exemplary embodiment, the positive electrode separation plate may be dented from the outer surface and may include an air inlet portion and an air outlet portion which communicate with the air flow path.

In addition, the electrolyte tank may be in contact with the gasket and may a level measuring device configured to measure a level of the stored electrolyte. The separation membrane may include a body portion interposed between the positive electrode and the negative electrode, and a projection portion that extends from the body portion to pass through the gasket and contacts the electrolyte of the electrolyte tank. In addition, the separation membrane may be a porous membrane made of polymers or ceramics.

In another aspect, the present invention provides a lithium air battery capable of preventing the depletion of electrolyte, and may include: a plurality of cells having a positive electrode that uses oxygen in air as an active material, a negative electrode, a separation membrane interposed between the positive electrode and the negative electrode, and an electrolyte for ionic conductivity, and may be laminated, wherein separation plates may be positioned between neighboring cells; a gasket interposed between the adjacent separation plates may contact the outer surface of the cell; an electrolyte tank positioned at the outside of the gasket may be used to store the electrolyte, in which the separation membrane may contact the electrolyte stored in the electrolyte tank through the gasket.

In an exemplary embodiment, the separation plate may include a positive electrode separation plate positioned at the outermost positive electrode side of the laminated cells, a negative electrode separation plate positioned at the outermost negative electrode side of the laminated cells, and a bipolar separation plate interposed between the adjacent cells. The positive electrode separation plate may include an air flow path formed in intaglio on the inner surface. In addition, the positive electrode separation plate may be dented from the outer surface and may include an air inlet portion and an air outlet portion which communicate with the air flow path.

The bipolar separation plate and the gasket may include an air inlet manifold penetrated to communicate with the air inlet portion and an air outlet manifold penetrated to communicate with the air outlet portion. In addition, the electrolyte tank may be in contact with the gasket and may include a level measuring device configured to measure a level of the stored electrolyte. The separation membrane may include a body portion interposed between the positive electrode and the negative electrode, and a projection portion that extends from the body portion to pass through the gasket and contacts the electrolyte of the electrolyte tank. In addition, the projection portion may pass through the gasket by avoiding the air inlet manifold and the air outlet manifold.

The present invention includes the above configuration to have the following effects. According to the present invention, since a separation membrane may contact an electrolyte stored in an electrolyte tank, the electrolyte may be supplied more easily to the lithium air battery. Therefore, the electrolyte in the lithium air battery may not be exhausted and thus, the lifespan of the battery may be significantly increased. The effects of the present invention are not limited to the effects described above. It should be understood that the effects of the present invention include all of the effects which can be inferred from the following description.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
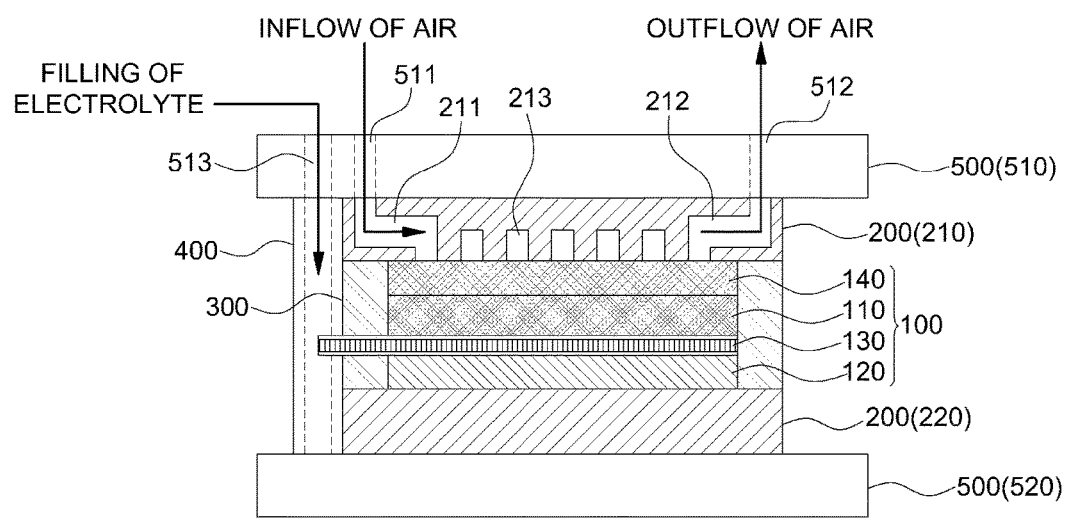
FIG. 1 illustrates a lithium air battery according to an exemplary embodiment of the present invention.

Reference numerals set forth in the Drawings includes reference to the following elements as further discussed below.

100: cell (unit cell)
110: positive electrode
120: negative electrode
130: separation membrane
131: body portion
132: projection
140: gas diffusion layer
200: separation plate
210: positive electrode separation plate
211: air inlet portion
212: air outlet portion
213: air flow path
220: negative electrode separation plate
230: bipolar separation plate
231: air flow path
300: gasket
400: electrolyte tank
500: end plate
510: upper plate
520: lower plate
511: air inlet aperture
512: air outlet aperture
600: air inlet manifold
700: air outlet manifold It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, the present invention will be described in detail through exemplary embodiments. The exemplary embodiments of the present invention may be modified in various forms as long as the gist of the invention is not changed. However, the scope of the present invention is not limited to the following exemplary embodiments. When it is determined that the present invention may obscure the gist of the present invention, the description for the known configurations and functions will be omitted.

A lithium air battery is a battery system in which lithium metal may be used as a negative electrode and oxygen in air may be used as an active material in a positive electrode (air electrode). In the negative electrode, oxidation and reduction reaction of lithium occurs and in the positive electrode, oxidation and reduction reaction of oxygen flowing from the outside occurs. Hereinafter, Chemical Formulas 1 and 2 illustrate reactions which occur in the negative electrode and the positive electrode during the discharge of the lithium air battery.

(Negative electrode: $Li \rightarrow Li^+ + e^-$)      Chemical Formula 1

(Positive electrode): $2Li^+ + O_2 + 2e^- \rightarrow Li_2O_2$      Chemical Formula 2

The lithium metal of the negative electrode may be oxidized to generate lithium ions and electrons. The lithium ions move to the positive electrode through the electrolyte and the electrons move to the positive electrode through an external conducting wire or a current collector. The positive electrode receives air from the outside and reacts with the lithium ions and the electrons which are transferred from the negative electrode to form $Li_2O_2$. The charging reaction proceeds reversely. In other words, like the following Chemical Formula 3, in the positive electrode, $Li_2O_2$ may be decomposed and the lithium ions and the electrons are generated.

(Positive electrode) $Li_2O_2 \rightarrow 2Li^+ + O_2 + 2e^-$      Chemical Formula 3

As exhibited in Chemical Formulas 1 to 3, the lithium ions need to smoothly move to operate the lithium air battery. The lithium ions move through the electrolyte in a liquid state, and the electrolyte is evaporated due to a characteristic of the lithium air battery to which air is continuously supplied from the outside and thus, the movement of the lithium ions is limited. As a result, the lifespan of the lithium air battery may be shortened.

The present invention is designed to solve the above problems. Hereinafter, the present invention will be described in detail so that the present invention may be easily implemented by those skilled in the art. FIG. 1 illustrates a lithium air battery composed of a single cell according to an exemplary embodiment of the present invention.

The lithium air battery according to the exemplary embodiment of the present invention may include a cell 100, separation plates 200, a gasket 300, an electrolyte tank 400, and end plates 500. The cell 100 may include a positive electrode 110 using oxygen as an active material, a negative electrode 120 as lithium metal, a separation membrane 130 interposed between the positive electrode 110 and the negative electrode 120, and an electrolyte (not illustrated) filled between the positive electrode 110 and the negative electrode 120 for ionic conductivity.

The cell 100 may further include a gas diffusion layer 140 for widely dispersing air flowing from the outside to the entire lithium air battery. The separation membrane 130 may be comprised of a polymer such as polyethylene or ceramics such as glass fiber. Accordingly, the separation membrane 130 as a nonconductor may insulate the positive electrode 110 and the negative electrode 120 from each other. The separation membrane 130 may be a porous membrane with a structure such as non-woven fabric. Accordingly, the electrolyte may be further soaked in the separation membrane 130. The cell 100 may be interposed between the separation plates 200. The separation plates 200 may include a positive electrode separation plate 210 positioned at the positive electrode side and a negative electrode separation plate 220 positioned at the negative electrode side.

In the present invention, the "positive electrode side" indicates a positive electrode direction in a laminated structure of the cells, and the "negative electrode side" indicates a negative electrode direction in the laminated structure of the cells. Further, the gasket 300 may be interposed between the positive electrode separation plate 210 and the negative electrode separation plate 220 from the outer surface of the cell 100. Accordingly, the cell 100 may be blocked from the outside by the separation plates 200 and the gasket 300 except for an air flow path 213, an air inlet portion 211, and an air outlet portion 212 of the positive electrode separation plate 210 to be described below.

In the present invention, the "outer surface" or the "outside" indicates an outer surface or an outer direction based on the lithium air battery, and the "inner surface" or the "inside" indicates an inner surface or an inner direction based on the lithium air battery. The end plates 500 may include an upper plate 510 and a lower plate 520 as a configuration for fixing and supporting the cell and other constituent elements in the laminated state. Even though not illustrated in the drawing, a fastening mechanism configured to fasten or couple the upper plate 510 and the lower plate 520 by applying pressure may be installed.

Referring to FIG. 1, in the lithium air battery according to the exemplary embodiment of the present invention, an air flow will be described below. The positive electrode separation plate 210 may include the air inlet portion 211 and the air outlet portion 212 which are dented from the outer surface. Further, the positive electrode separation plate 210 may include the air flow path 213 which is formed in intaglio on the inner surface and communicates with the air inlet portion 211 and the air outlet portion 212. The upper plate 510 may include an air inlet aperture 511 formed to communicate with the air inlet portion 211 and an air outlet aperture 512 formed to communicate with the air outlet portion 212.

Accordingly, external air may flow into the lithium air battery through the air inlet aperture 511 and the air inlet portion 211 and may flow along the air flow path 213. In particular, the gas diffusion layer 140 may diffuse the air to allow the flowing air to contact the positive electrode 110 more smoothly. The air may flow along the air flow path 213 in the lithium air battery and then may be discharged to the outside through the air outlet portion 212 and the air outlet aperture 512. While the air flows in the lithium air battery, the electrolyte soaked in the separation membrane 130 and the electrolyte which partially fills the positive electrode 110 may be evaporated. Accordingly, in the present invention, the electrolyte tank 400 that stores the electrolyte may be installed extraneous to the gasket 300 and the separation membrane 130 may contact the electrolyte stored in the electrolyte tank 400 through the gasket 300 to prevent the above problem from occurring.

Since a part of the separation membrane 130 may contact the electrolyte, when the electrolyte is evaporated in the lithium air battery, the electrolyte may be automatically supplied into the lithium air battery through the separation membrane 130. When the separation membrane 130 sufficiently includes the electrolyte to reach a saturated state, the electrolyte may not be automatically supplied and thus, the use amount of the electrolyte may not be excessive. In other words, the electrolyte may be supplied to the lithium air battery from the electrolyte tank 400 by the amount of the electrolyte which is evaporated in the lithium air battery.

An installation space of the electrolyte tank 400 is not limited the above description, the electrolyte tank 400 may be installed to contact the outer surface of the gasket 300. When the electrolyte tank 400 is installed at a predetermined distance from the lithium air battery, the separation membrane 130 is exposed to the outside, and thus, the electrolyte may not be smoothly supplied to the lithium air battery from the electrolyte tank 400. The shape of the electrolyte tank 400 is not limited, but may be a shape in which the electrolyte tank 400 is interposed between the end plates 500 by contacting the gasket 300. Further, the upper plate 510 may include an electrolyte inlet aperture 513 to fill the electrolyte tank 400 with the electrolyte. The electrolyte tank 400 may include a level measuring device (e.g., sensor) configured to measure a level of the electrolyte stored inside or outside the electrolyte tank 400. Accordingly, the amount of the electrolyte stored in the electrolyte tank 400 may be identified and filled.

Figure 2:
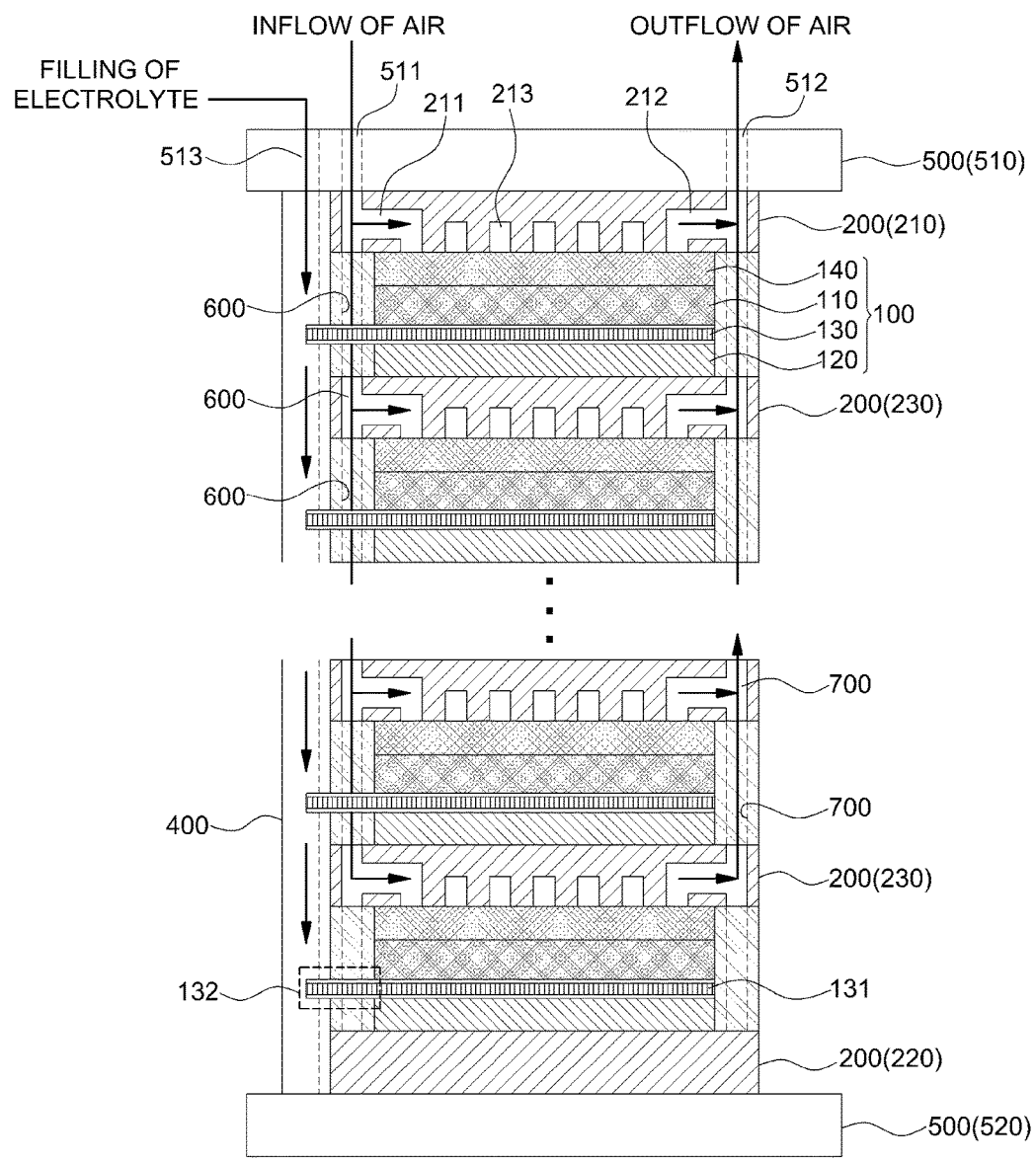
FIG. 2 illustrates a lithium air battery according to another exemplary embodiment of the present invention.

FIG. 2 illustrates a lithium air battery with a plurality of laminated cells according to another exemplary embodiment of the present invention. The lithium air battery according to another exemplary embodiment of the present invention may include a plurality of cells 100, separation plates 200, a gasket 300, an electrolyte tank 400, and end plates 500. The basic description of each configuration is described above and hereinafter, will be omitted.

The separation plates 200 may include a positive electrode separation plate 210 positioned at the outermost positive electrode side of the laminated cells, a negative electrode separation plate 220 positioned at the outermost negative electrode side of the laminated cells, and a bipolar separation plate 230 interposed between the adjacent cells and of which a first surface my contact the positive electrode 110 and a second surface may contact the negative electrode 120. The gaskets 300 may be interposed between the positive electrode separation plate 210 and the bipolar separation plate 230, between the adjacent bipolar separation plates 230, and between the bipolar separation plates 230 and the negative electrode separation plate 220.

Referring to FIG. 2, in the lithium air battery according to another exemplary embodiment of the present invention, an air flow will be described below. Since the air flow of the cell contacting the positive electrode separation plate 210 is the same as that of the lithium air battery according to the exemplary embodiment of the present invention, hereinafter, only a difference will be described in detail.

The gasket 300 and the bipolar separation plate 230 may include air inlet manifolds 600 formed to communicate with the air inlet portion 211 of the positive electrode separation plate 210. Accordingly, a portion of the air flowing through the air inlet portion 211 of the positive electrode separation plate 210 may flow along the air flow path 213 of the positive electrode separation plate, and the remaining air may be supplied to the adjacent cells through the air inlet manifold 600. The bipolar separation plate 230 may include an air flow path 231 which communicates with the air inlet manifold 600 and may be formed in intaglio which is similar to that of the positive electrode separation plate. The air flowing through the air inlet manifold 600 may flow along the air flow path 231 of the bipolar separation plate 230 to be transferred to each cell constituting the lithium air battery.

The gasket 300 and the bipolar separation plate 230 may include air outlet manifolds 700 formed to communicate with the air outlet portion 212 of the positive electrode separation plate 210. Accordingly, the air flowing along the air flow paths 213 and 231 of the positive electrode separation plate 210 and the bipolar separation plate 230 may be discharged to the outside through the air outlet manifold 700 and the air outlet portion 212. In another exemplary embodiment of the present invention, each separation membrane 130 included in the plurality of cells may contact the electrolyte stored in the electrolyte tank 400 through the gasket 300 contacting each cell 100.

However, in another exemplary embodiment of the present invention, unlike the aforementioned exemplary embodiment, the air inlet manifold 600 and the air outlet manifold 700 may be formed in the gasket 300. Accordingly, to prevent blocking of the air flow, the separation membrane 130 may pass through the gasket 300 by avoiding a portion where the air inlet manifold 600 and the air outlet manifold 700 are formed. The avoiding method or configuration is not limited thereto, but, the separation membrane 130 may be constituted by the body portion 131 and the projection portion 132, and thereafter, may pass through the gasket 300 by adjusting the shape of the projection portion 132.

The body portion 131 may be interposed between the positive electrode 110 and the negative electrode 120 to insulate the both electrodes from each other, and the projection portion 132 may extend from the body portion 131 to pass through gasket 300 and contact the electrolyte of the electrolyte tank 400. The lithium air battery according to the present invention has a technical feature that the separation membrane may contact the electrolyte stored in the electrolyte tank though the gasket. Therefore, when the electrolyte of the lithium air battery is volatilized, the electrolyte may be supplied to the inside of the lithium air battery from the electrolyte tank through the separation membrane. As a result, the depletion of electrolyte of the lithium air battery may be solved.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A lithium air battery, comprising:
a cell having a positive electrode using oxygen in air as an active material, a negative electrode, a separation membrane interposed between the positive electrode and the negative electrode, and an electrolyte for ionic conductivity, wherein the cell is interposed between separation plates;
a gasket interposed between the separation plates at an outer surface of the cell; and
an electrolyte tank positioned at an outer surface of the gasket and configured to store the electrolyte,
wherein the separation membrane extends through the gasket to contact the electrolyte stored in the electrolyte tank, and
wherein the separation membrane includes a body portion interposed between the positive electrode and the negative electrode, and a projection portion that extends from the body portion to pass through the gasket and contacts the electrolyte of the electrolyte tank.

2. The lithium air battery of claim 1, wherein the separation plates include a positive electrode separation plate positioned at a side of the positive electrode and a negative electrode separation plate positioned at a side of the negative electrode.

3. The lithium air battery of claim 2, wherein the positive electrode separation plate includes an air flow path which is formed in intaglio on an inner surface thereof.

4. The lithium air battery of claim 2, wherein the positive electrode separation plate is dented from an outer surface thereof and includes an air inlet portion and an air outlet portion which communicate with an air flow path.

5. The lithium air battery of claim 1, wherein the electrolyte tank contacts the gasket.

6. The lithium air battery of claim 1, wherein the electrolyte tank includes a level measuring device configured to measure a level of the stored electrolyte.

7. The lithium air battery of claim 1, wherein the separation membrane is a porous membrane made of polymers or ceramics.

8. A lithium air battery, comprising:
a plurality of cells having a positive electrode using oxygen in air as an active material, a negative electrode, a separation membrane interposed between the positive electrode and the negative electrode, and an electrolyte for ionic conductivity, wherein the plurality of cells is laminated, and separation plates are positioned between neighboring cells and at an outermost side of the laminated cells;
a gasket interposed between the separation plates at an outer surface of the cell; and
an electrolyte tank positioned at an outer surface of the gasket and configured to store the electrolyte,
wherein the separation membrane extends through the gasket to contact the electrolyte stored in the electrolyte tank, and
wherein the separation membrane includes a body portion interposed between the positive electrode and the negative electrode, and a projection portion that extends from the body portion to pass through the gasket and contacts the electrolyte of the electrolyte tank.

9. The lithium air battery of claim 8, wherein the separation plates include a positive electrode separation plate positioned at an outermost positive electrode side of the laminated cells, a negative electrode separation plate positioned at an outermost negative electrode side of the laminated cells, and a bipolar separation plate interposed between the neighboring cells.

10. The lithium air battery of claim 9, wherein the positive electrode separation plate includes an air flow path which is formed in intaglio on an inner surface thereof.

11. The lithium air battery of claim 9, wherein the positive electrode separation plate is dented from an outer surface thereof and includes an air inlet portion and an air outlet portion which communicate with an air flow path.

12. The lithium air battery of claim 11, wherein the bipolar separation plate and the gasket include an air inlet manifold formed to communicate with the air inlet portion and an air outlet manifold formed to communicate with the air outlet portion.

13. The lithium air battery of claim 8, wherein the electrolyte tank contacts the gasket.

14. The lithium air battery of claim 8, wherein the electrolyte tank includes a level measuring means device configured to measure a level of the stored electrolyte.

15. The lithium air battery of claim 8, wherein the separation membrane is a porous membrane made of polymers or ceramics.

16. The lithium air battery of claim 8, wherein the projection portion passes through the gasket by avoiding an air inlet manifold and an air outlet manifold.

* * * * *